(No Model.) 2 Sheets—Sheet 1.
C. M. HUSON.
WHEEL FOR BELTS OR CABLES AND MEANS FOR DRIVING THEM.
No. 312,275. Patented Feb. 17, 1885.
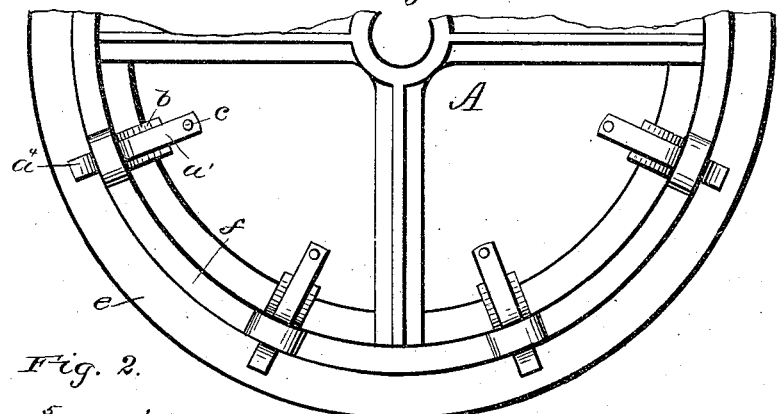
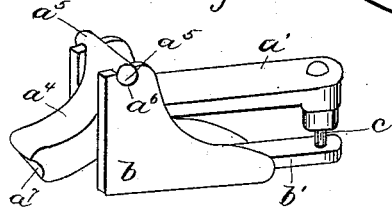
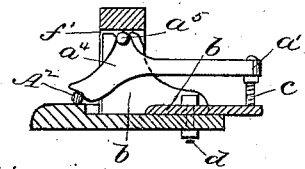
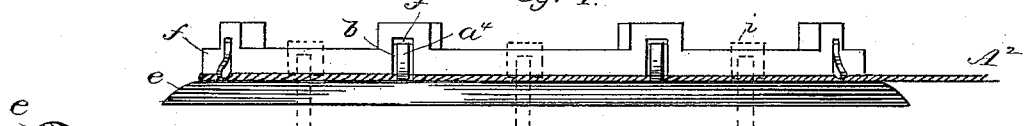
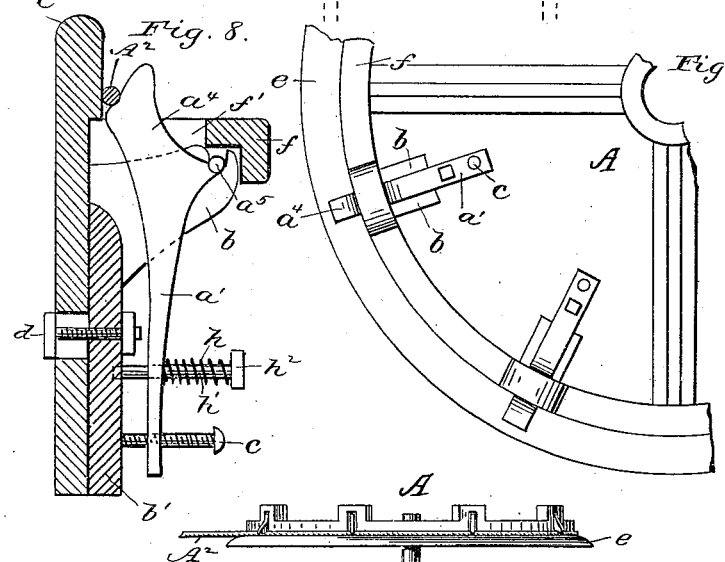
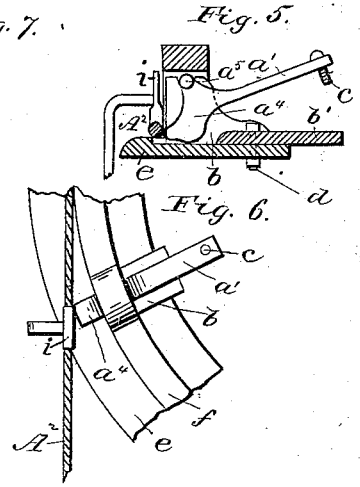
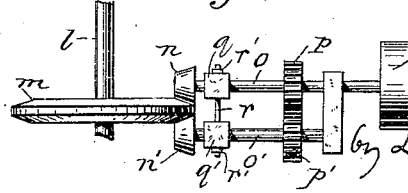
Witnesses: B. N. Sommers, L. H. Marshall
Inventor: Charles M. Huson by Doubleday & Bissell (No Model.) 2 Sheets—Sheet 2.
C. M. HUSON.
WHEEL FOR BELTS OR CABLES AND MEANS FOR DRIVING THEM.

No. 312,275. Patented Feb. 17, 1885.

Witnesses:
B. W. Sommers
L. H. Marshall

Inventor:
Charles M. Huson
by Doubleday & Bliss atty

UNITED STATES PATENT OFFICE.

CHARLES M. HUSON, OF DENVER, COLORADO.

WHEEL FOR BELTS OR CABLES AND MEANS FOR DRIVING THEM.

SPECIFICATION forming part of Letters Patent No. 312,275, dated February 17, 1885.

Application filed July 23, 1884. (No model.)

*To all whom it may concern:*

Be it known that I, CHARLES M. HUSON, a citizen of the United States, residing at Denver, in the county of Arapahoe and State of Colorado, have invented certain new and useful Improvements in Wheels for Belts and Means for Driving them, of which the following is a specification, reference being had therein to the accompanying drawings.

Figure 9:
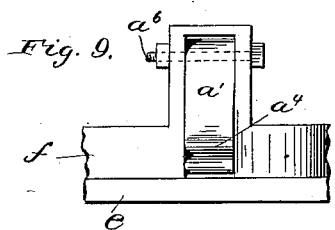
Figure 10:
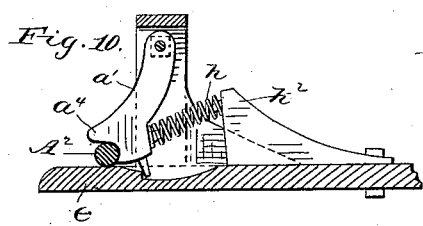
Figure 11:
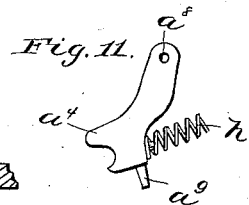
Figure 13:
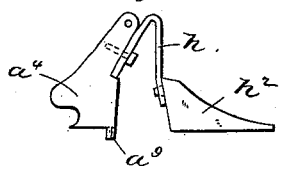
Figure 12:
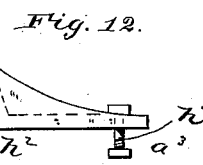
Figure 14:
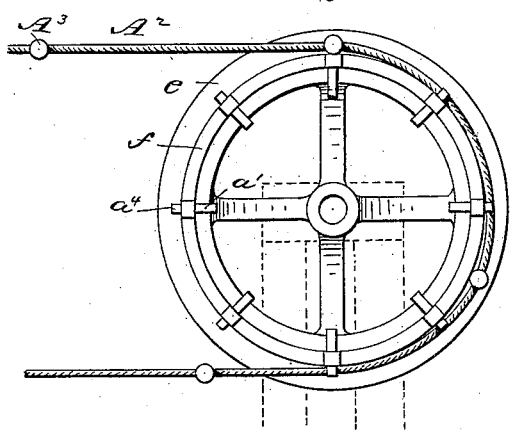
Figure 15:
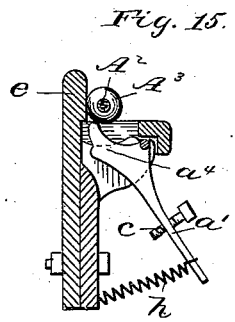
Figure 16:
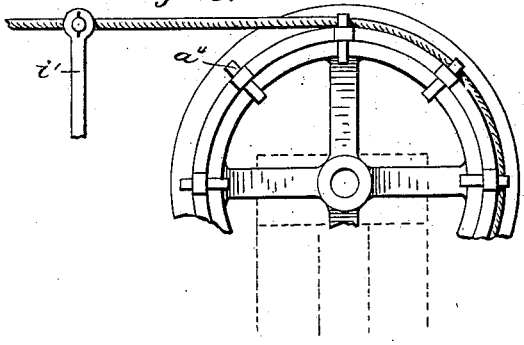
Figure 17:
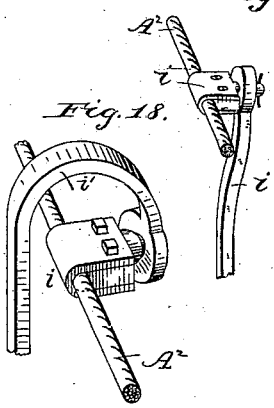
Figure 18:
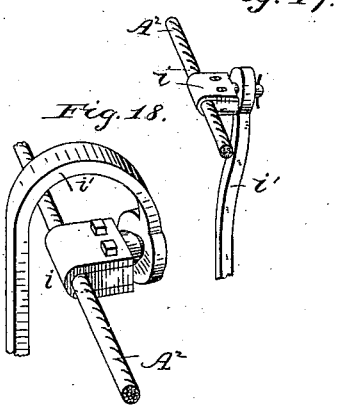
Figure 19:
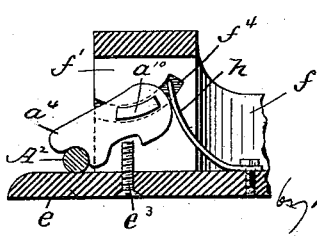

Figure 1 is a top plan view of a wheel embodying my improvements. Fig. 2 is a perspective of one of the gripping-levers and its frame detached. Fig. 3 is a section of the rim of the wheel. Fig. 4 is an edge view of the wheel. Fig. 5 is a section similar to that in Fig. 3, but showing the lever in the position occupied when thrown back by the clip or projection on the cable. Fig. 6 is a plan view of a portion of the wheel, showing the relation of a clip and a lever at the time they have come into contact. Fig. 7 is a face view of a part of a vertical wheel having a slightly-modified form of gripping devices. Fig. 8 is a section through the rim of the wheel in Fig. 7. Fig. 9 is a face view of a portion of a wheel having another modified form of gripping device embodying the invention. Fig. 10 is a sectional view of a wheel similar to that in Fig. 9. Fig. 11 shows detached the gripping-lever in Figs. 9 and 10. Fig. 12 shows detached the abutment in Fig. 10. Fig. 13 shows a construction substantially similar to that in Figs. 9, 10, and 11, except that a flat spring is used. Fig. 14 is a face view of a vertical wheel carrying a rope or cable provided with attachments for engaging carriages or other objects with the rope. Fig. 15 is a section on the line on Fig. 14. Fig. 16 is a face view of a similar wheel, together with a rope or cable, having a modified form of clip or hanger. Fig. 17 shows detached a clip or hanger of the character shown in Fig. 16. Fig. 18 shows a hanger of slightly-modified character. Fig. 19 shows another modification of the gripping device. Fig. 20 illustrates the devices for imparting power to the wheels which propel the cables.

This invention relates to mechanism for grasping a cable in wire-rope ways or tramways, the object, generally speaking, being to insure that those portions of the cable which have nothing attached thereto shall be firmly gripped, and at the same time insure that the cable shall not be thrown from the wheels or supports by reason of any devices carried by the cable of such nature as to enlarge the average diameter thereof. It is well known that the cables that are used in these tramways are for various purposes provided with attachments, these being sometimes of the nature of clips or hangers for the supporting of pendants when the cables are overhead, and sometimes of the nature of balls, bulbs, or other projections for the purpose of connecting a detachable gripper, especially in the case of underground cables.

Much trouble has been heretofore experienced in imparting power to and in properly guiding cables having such attachments. When grooved pulleys or wheels are used— that is to say, pulleys or wheels having grooves or recesses for the cable bounded at the sides by radially-projecting flanges—it is practically impossible to secure to the cable attachments for any of the above purposes which shall project outwardly therefrom in the direction of these flanges or rims that lie by the sides of the cable. Therefore, heretofore in the construction of such devices it has been necessary to employ a main wheel of a peculiar construction and combine therewith several guiding and retaining wheels, so shaped as to permit the cable attachment to pass, and at the same time with a greater or less degree of efficiency hold the cable in place on the main wheel.

I have succeeded in devising a simple apparatus whereby the cable can be guided and securely gripped, and whereby, also, any attachments which may be secured to the cable can be allowed to pass freely around or across the guiding or supporting wheels or pulleys.

One part of the invention consists in providing for the cable a guide or support (preferably of the nature of a revolving wheel or pulley) having one or more abutments which shall receive the pressure from the cable attachment, or that portion of the cable immediately adjacent to the attachment, and another abutment movable relatively to the aforesaid abutment, and adapted, when in normal position, to receive the pressure from the plane portions of the cable—that is, those portions of it not having attachments secured thereto, or being of the normal diameter.

In the drawings, $A^2$ represents, generally, the cable, which may be of any preferred material, though for most purposes use is made of the metal cables now commonly employed. It is supported at points between the termini in any well-known or preferred way, I generally mounting it upon anti-friction devices so constructed and arranged as to not only support the cable properly, but also to permit the passage of any attachments secured to the cable, such as clips, hangers, &c. At the termini I employ gripping and propelling devices of a novel and peculiar character, which are constructed and operated as follows:

A represents, generally, a wheel at the terminal point or station. As shown in Figs. 1, 3, 4, 5, and 6, it is mounted upon a non-horizontal axis—that is to say, an axis either vertical or more or less inclined to the horizon. It has in the construction shown in these figures a flange or supporting part, $e$, lying in a plane substantially parallel to that occupied by the cable, and upon which the cable rests. It has also an upwardly-rising rim, $f$, which in this construction operates as the stationary abutment above alluded to, which receives the inward pressure of the cable—that is to say, the radial pressure toward the center of the wheel. The flange or supporting part $e$ of the wheel may extend part way toward the center and be carried by spider-arms, or it may be solid from center to circumference, as circumstances demand.

Still referring to said figures, the rim $f$ is formed with apertures, as shown at $f'$, and in each of these there is situated a support or rim, $b\ b'$. It is fastened in place by means of one or more bolts, as at $d$, and the upwardly-extending plates or arms, $b$, are situated in the apertures $f'$. A gripping-lever, $a\ a^4$, is pivoted in the frame $b\ b'$ by means of trunnions $a^5$, which are seated in recesses in the upper ends of the arms $b$, as shown at $a^6$, Fig. 2. The outwardly-projecting part $a^4$ of the gripping-lever is somewhat enlarged, and is provided with a rabbet at $a^7$, in which the cable $A^2$ can be seated. This part $a^4$ operates as an abutment, which grips the plain portions of the cable when they are pressing against it, but which is moved by any projections or enlargements extending outwardly from the cable, as will more fully hereinafter appear. The part $a'$ of the lever extends inwardly, and in this construction it operates by its gravity to prevent the part $a^4$ from being thrown down, except when the movements of the various parts require it.

To regulate the downward throw of the gripping device, an adjusting-screw, $c$, is secured to arm $a'$, or is inserted into the upper face of plate $b$, it being in the plane of the arm $a'$, so that by means of it the movement of the arm can be regulated. Any suitable form of regulating device, however, can be readily substituted for that shown.

In the figures last alluded to the cable $A^2$ is shown as being provided with carriers or supporting devices, which are attached to the cable by means of clips $i$, these being separately-formed metallic blocks or plates, and so secured to the cable as to lie in the vertical plane thereof—that is to say, so as to project directly upward therefrom.

I do not limit the invention to which this case pertains to any particular construction or arrangement of the clip, as any of the cable attachments of this class heretofore known may be readily arranged to operate properly with the gripping-wheel, and therefore there is no necessity of describing any particular form of these devices in detail. However, the clip, it will be seen, constitutes, virtually, an enlargement of the part which comes in contact with the wheels, and it is in this respect that my improved gripping devices have a peculiar relation to the other parts. Therefore, so long as the cable carries enlargements or parts projecting outwardly from the normal or average diameter thereof, they may be successfully dealt with by my gripping devices when in proximity thereto.

It has been found impossible to combine with a cable having vertically-arranged clips a gripping-wheel having the common groove in the periphery—that is, a groove between two plain walls or rims—as the rim on the side of the clip will, by its engagement therewith, throw the cable from the groove. So, too, it has been impossible to employ a clip or projection lying in the horizontal plane of the cable in combination with the vertical supporting-wheel on account of a similar difficulty.

If a clip of the character of that shown at $i$, Figs. 5 and 6, strikes the wheel at a point between either of the consecutive gripping-levers, it will adapt itself to and bear against the rim or stationary abutment $f$, the plain portions of the cable on either side lying under the projecting parts of the adjacent levers; but if as it approaches the wheel it strikes the projecting end of one of the levers, as shown in Fig. 6, the lever immediately yields and takes a position more or less similar to that shown in Fig. 5, so that the clip is still permitted to preserve its normal vertical position. The projecting portions of the levers are analogous to the upper rim of a grooved pulley or sheave, so far as the engagement with the cable is concerned, but are totally unlike the rim of a wheel or sheave of this character by having this capacity to yield to permit the passage of any enlargement or projection carried by the cable.

I am aware of the fact that levers or curved bars of metal have been seated in the grooves or peripheries of wheels heretofore, and I do not broadly claim such movable gripping devices; but I am not aware of the fact that prior to my invention use has been made of one or more levers adapted to grip the plain portions of the cable, and also adapted to recede from clamps, clips, or other projections extending in any direction out from the cable. Of course the extent to which they recede is not necessarily material so long as they are removed from the path of the moving parts sufficiently far to prevent the cable or the devices attached thereto from being displaced from the wheel.

The gripping devices which have been heretofore used have had levers or dogs, each with a gripping-face arranged oppositely to another gripping-face; but there is a radical difference in my case in that when the movable grippers yield to permit the passage of the projection they move in the direction of their gripping-faces—that is to say, move toward the opposing gripping-surface—whereas heretofore whenever there was a yielding of these parts one gripping-face moved away from the opposing one—that is to say, away from the line of the cable. The superiority of my construction in this respect will be readily seen. I am enabled to preserve a powerful grip upon the plain portions of the cable, and at the same time the projections can have a free path provided by reason of the downward movement of the nose or operative portion of the lever.

Having above described that form of mechanism which I at present prefer, (shown in Figs. 1, 2, 3, 4, 5, and 6,) I will state that I do not wish to be limited to the details shown in the various parts thereof, as modifications will readily suggest themselves to those acquainted with such devices. Thus the inwardly-extending part $a'$ may be dispensed with, and the gripper can be constructed and arranged as shown in Figs. 9, 10, and 11.

In the construction there shown the gripper is pivoted by means of a through pin or bolt, or in any other suitable manner, and bears inwardly against a spring, $h$, which is shown as being held in place by a stud on the gripper and another upon an abutment, $h^2$, inside. A stop may be provided by means of a pin or lug, as shown at $a^9$, which shall prevent the gripper from being forced too far outward. Instead of the coiled spring shown at $h$ a flat one may be used, such as shown in Fig. 13. The abutment $h^2$ is secured in place by means of a bolt and nut, as shown at $h^3 a^3$; nor is it necessary that the gripper should be pivoted, as it may be arranged to slide and accomplish the purposes required. Thus in Fig. 19 a construction is shown in which the gripper is held in place by means of lugs $a^{10}$, fitting ways, as at $f^4$. When the cable presses upon the gripper, it can slide inward, and when the pressure is withdrawn the spring $h$ forces it outward again. A screw at $e^3$ acts as a stop.

The wheels above referred to have been described as mounted on vertical axes and revolving horizontally; but they may be arranged to operate in vertical planes as well, and gripping devices such as shown in Figs. 7, 8, 9, 10, 11, 12, and 13 can be used.

In Figs. 7 and 8 a lever substantially like that in Figs. 1, 2, and 3 is shown, there being combined with it a spring, $h$, for keeping it in proper position when not engaged with the cable.

It is often desirable to employ clips extending horizontally outward from the cable for supporting the pendants or hangers. In Figs. 17 and 18 I have shown a clip so arranged, but do not wish to be limited to any particular style, as the invention is applicable under any circumstances where there are devices projecting outward horizontally.

In Figs. 14 and 15 are shown at $A^3$ cable enlargements or attachments adapted to engage with the detachable grippers employed for connecting vehicles with a cable and disconnecting them therefrom.

In Fig. 20 are shown the improved means by which power is imparted to the grip-wheels.

$l$ is the shaft carrying a friction-wheel having two bevel-faces adapted to engage with the bevel friction-pinions $n\ n'$. The latter are carried, respectively, by shafts, and power is transmitted from wheel $o$ to $o'$ by spur-gear $p$ and $p'$.

$q\ q'$ are bearing-blocks, through which pass the shafts, and through the blocks passes a rod, $r$. The rod $r$ is threaded and provided with nuts $r'$ at the ends, by which the blocks $q\ q'$ can be drawn toward each other. By these means the pressure of the wheels $n$ and $n'$ can be adjusted to any point.

What I claim is—

1. In a cable tramway, the combination, with a terminal or other wheel for guiding the cable, of one or more levers movable relatively to the wheel, each provided with a guiding or engaging face for the cable, and situated, substantially as set forth, to be moved out of the path of the cable by projections carried by the latter, as described.

2. In a cable tramway, a terminal or other wheel having a lever movable relatively to the wheel, a portion of which lies in the path of the cable, and is provided with a face for engaging therewith, in combination with a cable having outwardly-extending projections adapted to press radially inward and move the said lever out of the path of the cable, substantially as set forth.

3. The combination, with the cable having upwardly-extending projections for supporting the receptacles or carriers, of a terminal or other wheel for guiding the cable, having a flange lying, substantially as set forth, parallel with the plane of the cable, and one or more levers shaped and adapted, substantially as set forth, to engage with the free portions of the cable without moving, and to yield when pressed by the aforesaid projections upon the cable, as described.

4. In a cable tramway, the combination of a cable, clips or projections carried thereby, a wheel in contact with which the cable passes, a flange or abutment thereon stationary relatively to the wheel, and which resists the inward pressure of the cable, and movable levers or abutments on the wheel against which the plain portions of the cable bear, but which at the approach of the aforesaid projections yield and are moved out of the way thereof, substantially as set forth.

5. In a tramway-cable, the combination of a cable, clips or projections carried thereby, a wheel in contact with which the cable passes, movable levers on the wheel, each having a cable-gripping face or edge, and an opposing cable-gripping face, the gripping-faces being so situated relatively to each other as to form a throat for the cable, and the lever being arranged to swing toward the opposing gripping-face to permit the passage of the aforesaid projections carried by the cable, as set forth.

6. In a cable tramway, the combination of the cable, clips or projections carried thereby, a wheel in contact with which the cable passes, and gripping-levers on said wheel, each having its cable-engaging portion shaped, substantially as set forth, to form a recess for the cable, and adapted to swing in the direction of the plane of the cable when moving out of the path of the projections on the cable, substantially as set forth.

7. In a cable tramway, the combination of the cable, the clips or projections carried thereby, the wheel A, the flange or abutment $f$, and gripping-levers $a\ a^4$ projecting outwardly from the part $f$, and arranged to yield inwardly, substantially as set forth.

8. In a cable tramway, the combination of the cable, clips or projections carried thereby, a wheel in contact with which the cable passes, the gripping-levers, each having a part lying within the path of the said clips or projections, and a pivot for said levers situated to have the cable-engaging portion of the lever between the pivot and the cable, substantially as set forth.

9. In a cable tramway, the combination of the cable, clips or projections carried thereby, a wheel in contact with which the cable passes, the levers on the wheel, each having the cable-engaging surface, and the part $a^4$, which engages with the projections on the cable, and the pivot arranged to have the part $a^4$ lying between the pivot and the surface which engages with the cable, substantially as and for the purposes set forth.

10. In a cable tramway, the combination of the cable, clips or projections carried thereby, a wheel in contact with which the cable passes, a series of gripping-levers, each carried by and moving upon the wheel, and a flange through which the said levers project, said parts being arranged substantially as set forth, whereby the plain portions of the cable are engaged by said levers, but the latter yield to permit the clips or projections on the cable to bear against the wheel-flange, as described.

11. The combination, with a power-wheel, of a friction-wheel connected with said power-wheel having two friction-faces, two friction-pinions bearing oppositely to each other against said friction-faces, and means, substantially as described, for drawing toward each other the friction-pinions and forcing them against the friction-wheel, substantially as set forth.

12. The combination, with a driven wheel, of the wheel $m$, having two opposite friction-surfaces, two friction-pinions, $n\ n'$, bearing oppositely to each other against said wheel $m$, the power-transmission wheels $p\ p'$, and means for drawing toward each other the pinions $n\ n'$ and forcing them against the friction-wheel, substantially as set forth.

13. The combination, with a driven wheel, of a friction-wheel, $m$, a friction-pinion, $n$, and a threaded rod adapted, substantially as set forth, to force the pinion $n$ more or less tightly against the wheel $m$, substantially as set forth.

In testimony whereof I affix my signature in presence of two witnesses.

CHARLES M. HUSON.

Witnesses:
GEO. C. BATES,
GRACE BORROWS.